United States Patent
Yeh

(10) Patent No.: US 7,269,229 B2
(45) Date of Patent: Sep. 11, 2007

(54) REDUCED MEMORY ARCHITECTURE FOR EDGE MODULATOR

(75) Inventor: Yuh-Miin Yeh, Hsin-Chu (TW)

(73) Assignee: MediaTek Inc., Hsin-Chu (TW)

( * ) Notice: Subject to any disclaimer, the term of this patent is extended or adjusted under 35 U.S.C. 154(b) by 819 days.

(21) Appl. No.: 10/642,822

(22) Filed: Aug. 19, 2003

(65) Prior Publication Data

US 2004/0081255 A1    Apr. 29, 2004

(30) Foreign Application Priority Data

Sep. 18, 2002    (TW)    .............................. 91121318 A

(51) Int. Cl.
*H04L 27/10* (2006.01)
*H04L 27/18* (2006.01)
*H04L 27/20* (2006.01)
*H03C 3/00* (2006.01)

(52) U.S. Cl. ....................... 375/279; 375/308; 332/103

(58) Field of Classification Search ................ 375/269, 375/279, 308; 332/103

See application file for complete search history.

(56) References Cited

U.S. PATENT DOCUMENTS 4,628,297 A * 12/1986 Mita et al. ..................... 341/56
4,725,844 A * 2/1988 Goodwin et al. ............ 342/374
6,421,379 B1 * 7/2002 Vannatta et al. ............. 375/229
2002/0150068 A1 * 10/2002 Orr et al. ..................... 370/335
2004/0081255 A1 * 4/2004 Yeh ............................. 375/308

FOREIGN PATENT DOCUMENTS

DE    38 39 919 C2    6/1990
DE    197 13 830 A1    11/1997
DE    198 21 248 A1    11/1998

* cited by examiner

*Primary Examiner*—David C. Payne
*Assistant Examiner*—Aslan Ettehadieh
(74) *Attorney, Agent, or Firm*—Troxell Law Office, PLLC

(57) ABSTRACT

The present invention is a filtering apparatus in an 8 Phase Shift Keying (8PSK) system. The filtering apparatus comprises a π/16 phase shift module, a weight distribution module, and a combination module. The π/16 phase shift module is used for shifting a second vector from a 3π/8 phase shift module with π/16 radians to generate a corresponding third vector. The weight distribution module is used for distributing a plurality of selected weights to a predetermined distribution waveform and storing a plurality of corresponding weighted distribution waveforms. The combination module, according to the third vector, is used for determining which weight distribution waveforms to be selected from the weight distribution module and combining the selected weighted distribution waveforms to generate a modulation signal. The filtering apparatus and method of the present invention may save a lot of memory in the filtering process.

20 Claims, 7 Drawing Sheets

REDUCED MEMORY ARCHITECTURE FOR EDGE MODULATOR

BACKGROUND OF THE INVENTION

1. Field of the Invention

The present invention relates to a filtering apparatus and method, and more particularly to a filtering apparatus and method in mobile communication apparatus.

2. Description of the Prior Art

To enhance the capability of data processing of mobile phone and base station, the researchers of wireless system develop the technology of 2.5 G for the operator of wireless communication to provide the users with voice and high-speed data service without replacing the whole telecommunication infrastructure.

An important technology, the Enhanced Data for GSM Evolution (EDGE), interests the researchers of 2.5G system. The EDGE uses the modulation method of improved 8PSK and is an innovative technology to the current GSM system. The EDGE may provide the data transmission rate of 384 kbps for system to supply the solution of voice, data, Internet linkage, and other kinds of mutual linkage. The GSM 5.04 provides the standard for the modulation method of 8PSK.

Please refer to the modulation method of 8PSK of EDGE stipulated in GSM 5.04 (V8.0.8). The modulation method of 8PSK comprises the three following steps: First, perform an input with a Gray mapping. Second, perform with a 3π/8 phase shift. Finally, get an output by a filtering process, and provide the output for a RF system to generate a corresponding RF signal.

Please refer to FIG. 1 and FIG. 2. FIG. 1 is a schematic diagram of converting a digital bit to a first vector by Gray mapping of the prior art. FIG. 2 is a schematic diagram of converting the first vector shown in FIG. 1 to a second vector by the 3π/8 phase shift module. The input of 8PSK system is a series of digital bits. A set of every 3 digital bits ($d_{3i}$, $d_{3i+1}$, $d_{3i+2}$) is treated as one signal processing unit. The 8PSK system converts the set of every 3 digital bits to a first vector ($S_i = e^{j2\pi l/8}$) by Gray mapping. The first vector will be converted to a second vector ($\hat{S}_i = S_i \cdot e^{ji3\pi/8}$) by 3π/8 phase shift. The second vector is output to be a modulation signal (Ii, Qi) by a filtering process. The modulation signal is the output of 8PSK system and is taken as a baseband signal. The baseband signal may be provided to a RF transmitter to proceed with the signal modulation. The object is to generate a RF signal for wireless communication. The modulation signal (Ii, Qi) is also called y(t') and may be shown as the following equation:

$$y(t') = \sum_i \hat{s}_i \cdot c_o\left(t' - iT + \frac{5}{2}T\right)$$

wherein T is a time period.

The above equation represents that y(t') is the result of multiplying a plurality of second vectors with the corresponding predetermined distribution waveforms or called filtering coefficient Co(t) and summing up the values.

SUMMARY OF THE INVENTION

The present invention is a filtering apparatus and method in an 8PSK apparatus.

The 8PSK apparatus comprises a Gray mapping module, a 3π/8 phase shift module, and a filtering apparatus. The Gray mapping module is used for mapping a set of every 3 digital bits into a corresponding first vector by a predetermined mapping process. The 3π/8 phase shift module is used for shifting the phase of the first vector from the Gray mapping module to generate a corresponding second vector by a predetermined phase shift process. The filtering apparatus is used for executing a filtering process and filtering the second vector from the 3π/8 phase shift module to generate one corresponding modulation signal out of the plurality of modulation signals.

The filtering apparatus of the present invention comprises a π/16 phase shift module, a weight distribution module, and a combination module. The π/16 phase shift module is used for further shifting the second vector from the 3π/8 phase shift module with π/16 radians to generate a corresponding third vector. The weight distribution module is used for distributing a plurality of selected weights to a predetermined distribution waveform and for storing a plurality of corresponding weighted distribution waveforms. The combination module, according to the third vector, generates the modulation signal (Ii, Qi).

The present invention relates to an improvement of the 8PSK apparatus and method. Due to the improvement of the filtering process, the present invention may save more memories in the filtering process than the prior art.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 3:
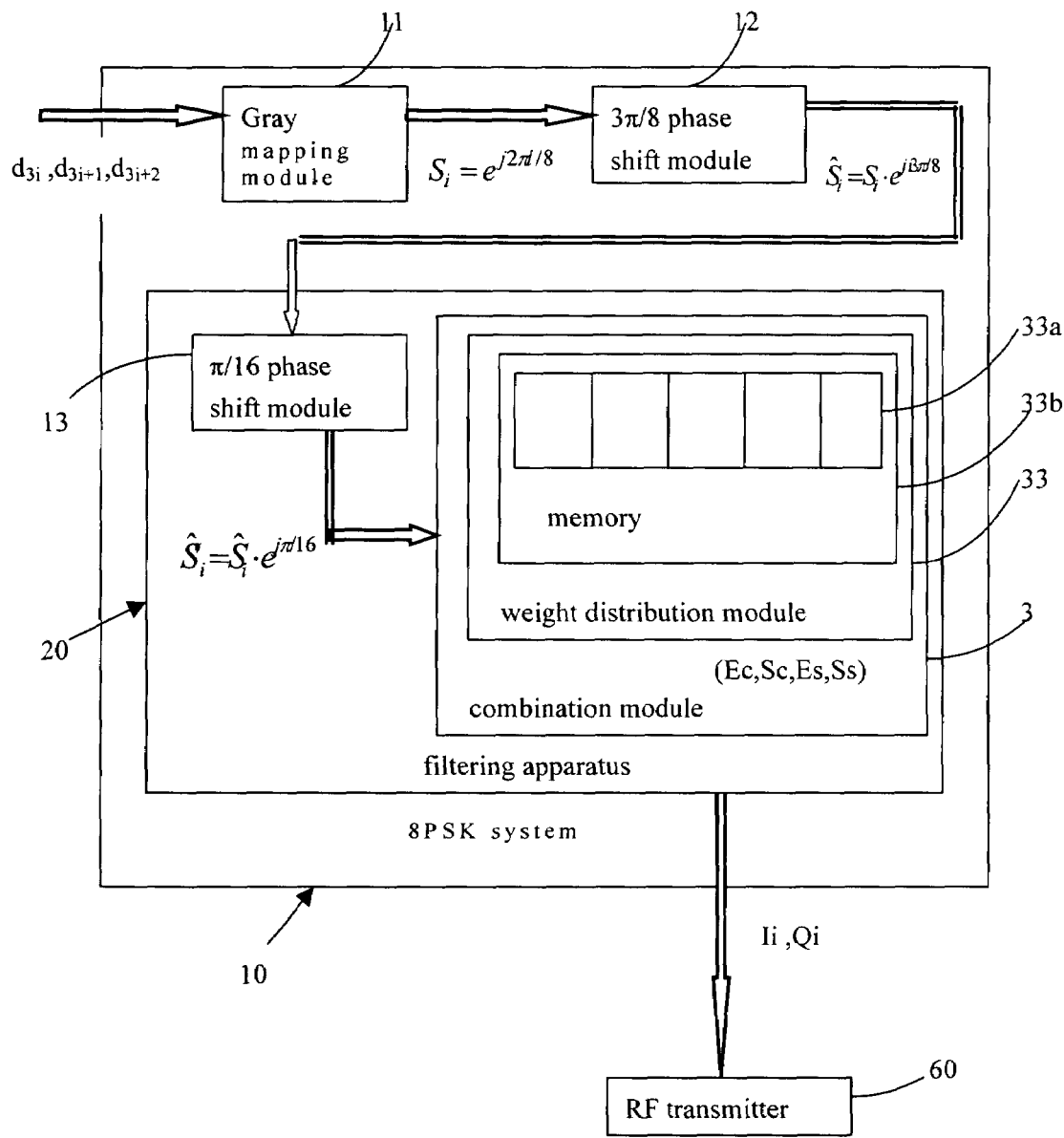
FIG. 3 is a schematic diagram of a filtering apparatus and an 8PSK system according to the present invention.

Please refer to FIG. 3. FIG. 3 is a schematic diagram of a filtering apparatus 20 and an 8PSK system 10 according to the present invention. The present invention is the filtering apparatus 20 in the 8PSK system 10. The 8PSK system 10 is used for encoding a series of digital bits ($d_{3i}$, $d_{3i+1}$, $d_{3i+2}$) to output a plurality of corresponding modulation signals (Ii, Qi). The 8PSK system 10 comprises a Gray mapping module 11, a $3\pi/8$ phase shift module 12, and a filtering apparatus 20.

The Gray mapping module 11 is used for mapping a set of every 3 digital bits into a corresponding first vector $S_i$ by a predetermined mapping process. The $3\pi/8$ phase shift module 12 is used for shifting the phase of the current first vector $S_i$ from the Gray mapping module 11 to generate a corresponding second vector $\hat{S}_i$ by a predetermined phase shift process. The filtering apparatus 20 is used for filtering the current second vector $\hat{S}_i$ from the $3\pi/8$ phase shift module 12 to generate one modulation signal (Ii, Qi). The modulation signal is a baseband signal provided to a RF transmitter 60 to generate a corresponding RF signal.

Figure 1:
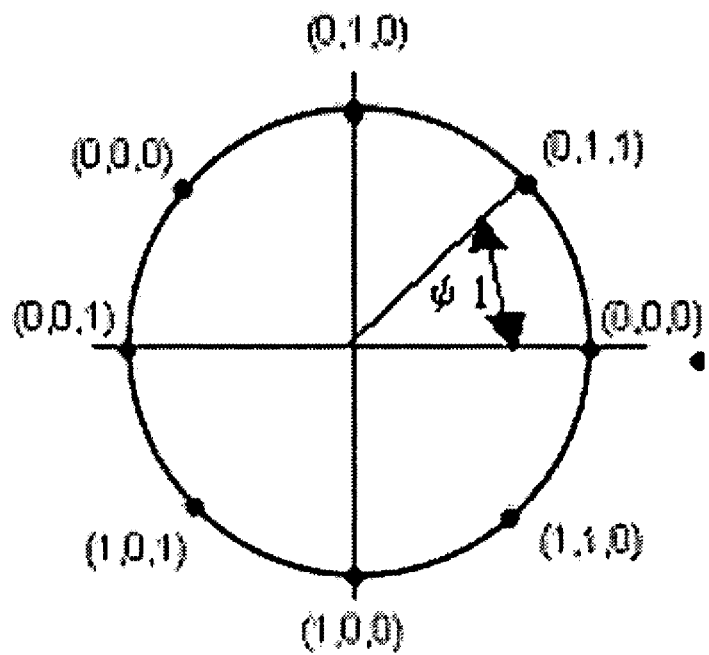
FIG. 1 is a schematic diagram of converting a digital bit to a first vector by Gray mapping of the prior art.
Figure 2:
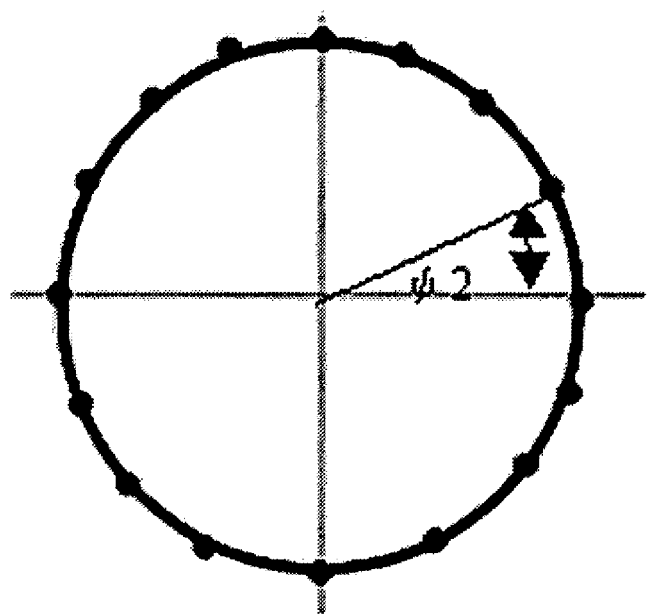
FIG. 2 is a schematic diagram of converting the first vector shown in FIG. 1 to a second vector by 3π/8 phase shifting.

The set of every 3 digital bits mentioned in the above constitutes 8 different permutations, and the 8 different permutations are (1, 1, 1), (0, 1, 1), (0, 1, 0), (0, 0, 0), (0, 0, 1), (1, 0, 1), (1, 0, 0), and (1, 1, 0). The predetermined mapping process in the Gray mapping module 11 maps each permutation of the 3 digital bits into the corresponding first vector $S_i$ ($S_i = e^{j2\pi i/8}$) having the same magnitude but different phases, and the phase difference between the adjacent first vectors $S_i$ is $\pi/4$. As shown in FIG. 1, the phase difference $\phi 1$ between the adjacent first vectors is $\pi/4$. The predetermined phase shift process used in the $3\pi/8$ phase shift module 12 is described in the following: each time the phase of the current first vector $S_i$ shifted by the $3\pi/8$ phase shift module 12 is more $3\pi/8$ radians than the phase of the previous first vector $S_i$ shifted by the $3\pi/8$ phase shift module 12, thereby generating the corresponding second vectors $\hat{S}_i$. The second vectors $\hat{S}_i$ ($\hat{S}_i = S_i \cdot e^{ji3\pi/8}$) have only 16 different possibilities, and the phase difference between the adjacent second vectors $\hat{S}_i$ is $\pi/8$. As shown in FIG. 2, the phase difference $\phi 2$ between the adjacent second vectors is $\pi/8$. The predetermined mapping process in the Gray mapping module 11 and the phase shift process in the $3\pi/8$ phase shift module 12 are defined in the standard of GSM 5.04 (V8.0.8) and the standard process in the 8PSK system. The process will not be described in detail here.

As shown in FIG. 3, the filtering apparatus 20 comprises a $\pi/16$ phase shift module 13, a weight distribution module 33, and a combiner 3. The $\pi/16$ phase shift module 13 is used for further shifting the current second vector $\hat{S}_i$ from the $3\pi/8$ phase shift module 12 with $\pi/16$ radians to generate a corresponding third vector $\hat{S}'_i$ ($\hat{S}'_i = \hat{S}_i \cdot e^{j\pi/16}$). The weight distribution module 33 is used for distributing a plurality of selected weights to a predetermined distribution waveform and for storing a plurality of corresponding weighted distribution waveforms. The predetermined distribution waveform is divisible to be a plurality of sub-distribution waveforms. The weight distribution module 33 comprises a memory 33a having a plurality of memory units 33b. Each memory unit 33b is used to store plural sub-distribution waveforms after the weight distribution. The combiner 3, according to the current third vector $\hat{S}'_i$, is used for determining which weight distribution waveforms are selected from the weight distribution module 33, and combining the selected weighted distribution waveforms to generate the modulation signal (Ii, Qi).

Figure 4:
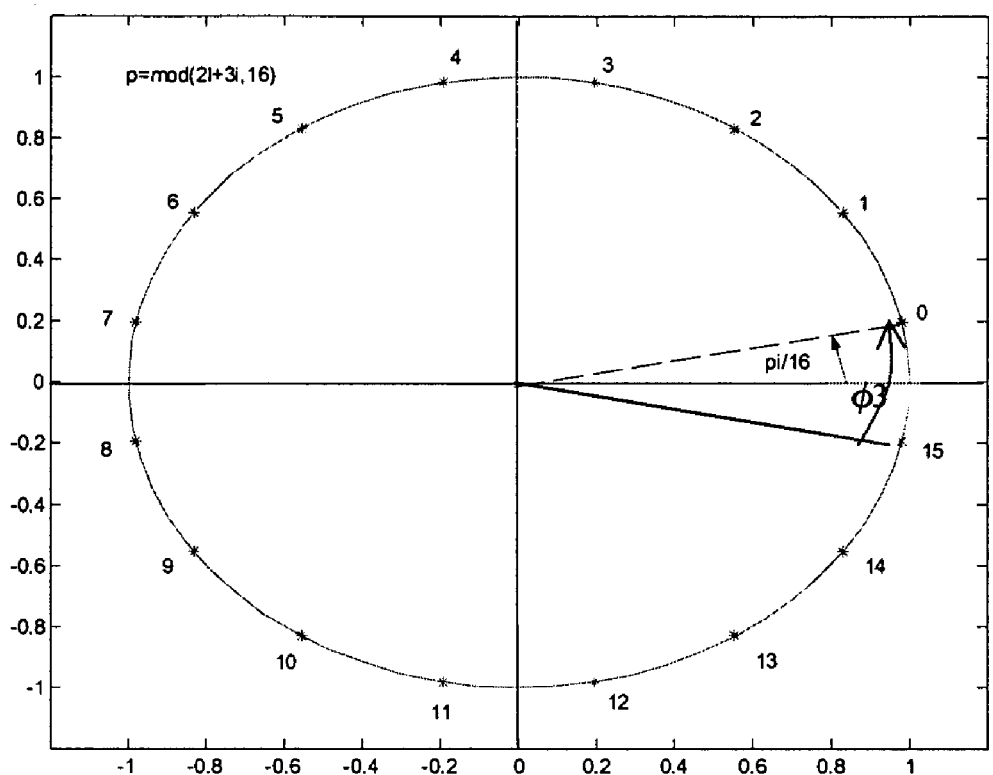
FIG. 4 is a schematic diagram of converting the second vector shown in FIG. 3 by π/16 radians.

Please refer to FIG. 4. FIG. 4 is a schematic diagram that a $\pi/16$ phase shift module 13 shown in FIG. 3 shifts $\pi/16$ radians. The $\pi/16$ phase shift module 13 shifts each second vector $\hat{S}_i$ to a corresponding third vector $\hat{S}'_i$. The combiner 3 processes the third vector $\hat{S}'_i$ to be an encoding signal and finds the proper filtering method by the encoding signal. The third vectors $\hat{S}'_i$ ($\hat{S}'_i = \hat{S}_i \cdot e^{j\pi/16}$) have only 16 different possibilities, and the phase difference between the two adjacent third vectors is $\pi/8$. As shown in FIG. 4, the phase difference $\phi 3$ between the two adjacent third vectors is $\pi/8$.

Each third vector $\hat{S}'_i$ is composed of a real part and an imaginary part. The real part is composed of a real-part magnitude and a real-part sign digit wherein the real-part magnitude represents the absolute value of the real part, and the real-part sign digit represents the positive or negative sign of the real part. The imaginary part is composed of an imaginary-part magnitude and an imaginary-part sign digit wherein the imaginary-part magnitude represents the absolute value of the imaginary part, and the imaginary-part sign digit represents the positive or negative sign of the imaginary part. The plurality of real-part magnitudes and imaginary-part magnitudes are selected from one of the following combinations: $\cos(\pi/16)$, $\cos(3\pi/16)$, $\cos(5\pi/16)$, and $\cos(7\pi/16)$.

Figure 5:
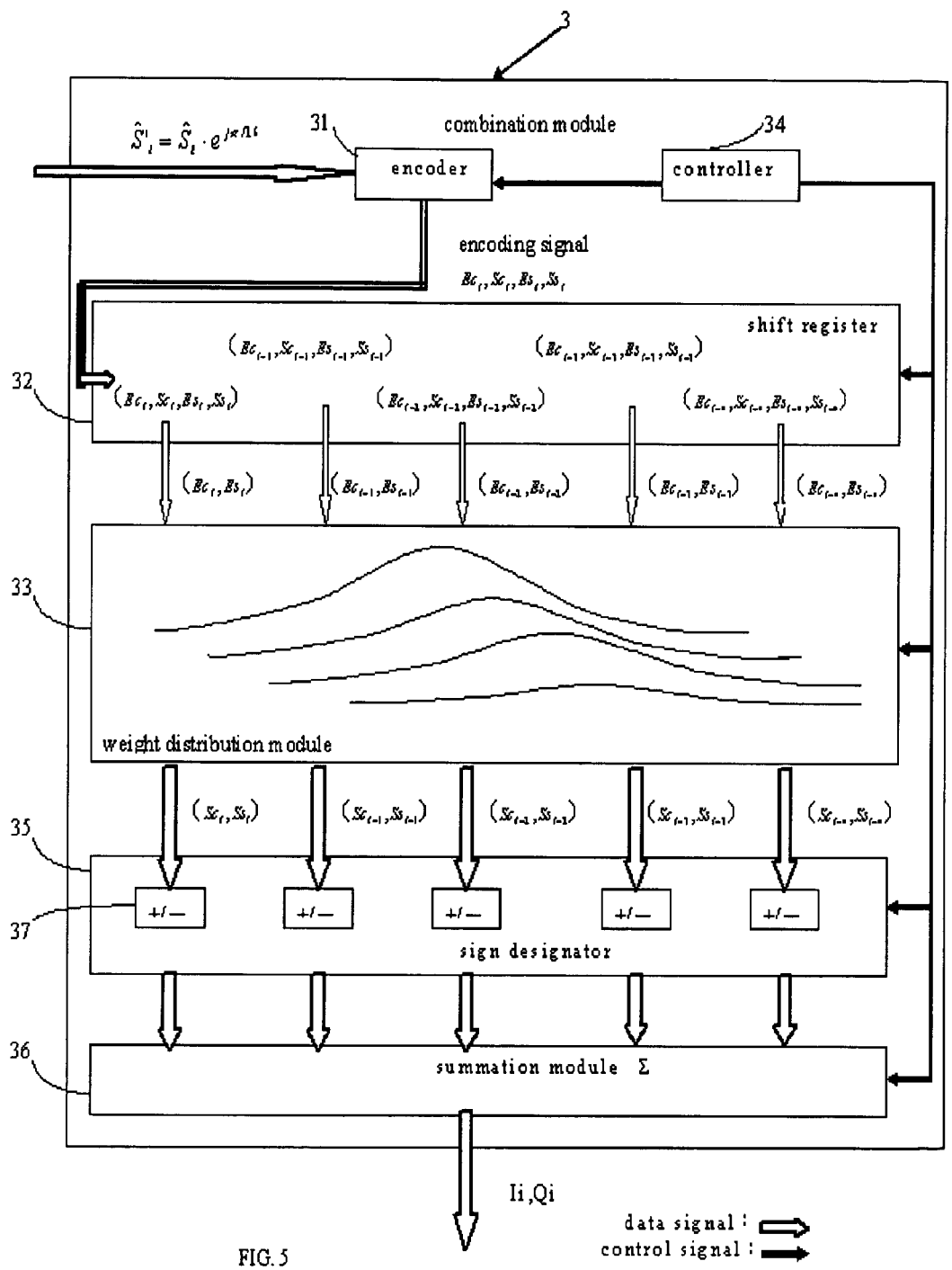
FIG. 5 is a schematic diagram of a combination module in the filtering apparatus according to the present invention.

Please refer to FIG. 5. FIG. 5 is a schematic diagram of a combiner 3 in the filtering apparatus 20 according to the present invention. The combiner 3, according to the third vector, generates the modulation signals by a combination process. The combination module 3 comprises an encoder 31 and a shift register 32. The encoder 31, according to the phase of each third vectors $\hat{S}'_i$, is used for encoding the third vector $\hat{S}'_i$ to generate a corresponding encoding signal. The encoding signal will be used in the following combination process. The shift register 32 comprises a plurality of buffer units (not shown in FIG. 5) for temporarily storing the plurality of current and previous encoding signals generated by the encoder 31. The weight distribution module 33 is involved in the combination module 3, and the weights selected by the weight distribution module 33 is one of the following combinations: $\cos(\pi/16)$, $\cos(3\pi/16)$, $\cos(5\pi/16)$, and $\cos(7\pi/16)$.

As shown in FIG. 5, the combination module 3 further comprises a controller 34, a sign designator 35, and a summation module 36. The controller 34 is used for selecting the corresponding weighted distribution waveforms from the weight distribution module 33 in responsive to the real-part magnitude codes in the buffer units. The weighted distribution waveforms are composed of current encoding signals and previous 4 encoding signals according to a plurality of selected weights respectively.

The sign designator 35 comprises a plurality of sign designation units 37. The sign designator 35, under the control of the controller 34, is used for designating the corresponding positive or negative sign to the weighted distribution waveforms selected by the controller 34 in responsive to the real-part sign codes or the an imaginary-part sign codes. The summation module 36 is used for summing up the plurality of weighted distribution waveforms after the sign designator 35 completes the sign designation to generate the real-part modulation signal.

The controller 34 further selects the corresponding weighted distribution waveforms from the weight distribution module 33 in responsive to the imaginary-part magnitude codes in the buffer units. The sign designator 35, under the control of the controller 34, designates the corresponding positive or negative sign to the weighted distribution waveforms selected by the controller 34 according to the imaginary-part sign codes: The summation module 36 sums up the plurality of weighted distribution waveforms after the sign designator 35 completes the sign designation to generate the imaginary-part modulation signal. The modulation signal comprises a real-part modulation signal Ii and an imaginary-part modulation signal Qi.

The filtering process of the filtering apparatus 20 of the present invention multiplies current and previous predetermined input vectors with the predetermined distribution waveforms and sums up the result to generate the output modulation signals and output. There are various methods of performing the filtering process. According to the present invention, a plurality of weighted distribution waveforms generated by multiplying the only 16 input vectors with the predetermined distribution waveforms are pre-calculated and pre-stored in memory.

magnitudes of the third vectors are selected from one of the following combinations: $\cos(\pi/16)$, $\cos(3\pi/16)$, $\cos(5\pi/16)$, and $\cos(7\pi/16)$. Therefore, any real-part magnitude and imaginary-part magnitude of Table 1 is one of the above combinations. And the 4 real-part magnitude codes $Ec_i$ are $\cos(\pi/16):(00,1)$, $\cos(3\pi/16):(01,1)$, $\cos(5\pi/16):(10,1)$, and $\cos(7\pi/16):(11,1)$ respectively.

TABLE 1

| Real Part | | | | Imaginary Part | | | | Encoding Signal Encoding |
|---|---|---|---|---|---|---|---|---|
| p | $\cos(\pi(2p+1)/16)$ | Ec | Sc | p | $\sin(\pi(2p+1)/16)$ | Es | Ss | (Ec, Sc, Es, Ss) |
| 0 | $\cos(\pi/16)$ | 0(00) | 1(1) | 0 | $\cos(7\pi/16)$ | 3(11) | 1(1) | (00, 1, 11, 1) |
| 1 | $\cos(3\pi/16)$ | 1(01) | 1(1) | 1 | $\cos(5\pi/16)$ | 2(10) | 1(1) | (01, 1, 10, 1) |
| 2 | $\cos(5\pi/16)$ | 2(10) | 1(1) | 2 | $\cos(3\pi/16)$ | 1(01) | 1(1) | (10, 1, 01, 1) |
| 3 | $\cos(7\pi/16)$ | 3(11) | 1(1) | 3 | $\cos(\pi/16)$ | 0(00) | 1(1) | (11, 1, 00, 1) |
| 4 | $-\cos(7\pi/16)$ | 3(11) | −1(0) | 4 | $\cos(\pi/16)$ | 0(00) | 1(1) | (11, 0, 00, 1) |
| 5 | $-\cos(5\pi/16)$ | 2(10) | −1(0) | 5 | $\cos(3\pi/16)$ | 1(01) | 1(1) | (10, 0, 01, 1) |
| 6 | $-\cos(3\pi/16)$ | 1(01) | −1(0) | 6 | $\cos(5\pi/16)$ | 2(10) | 1(1) | (0, 1, 0, 10, 1) |
| 7 | $-\cos(\pi/16)$ | 0(00) | −1(0) | 7 | $\cos(7\pi/16)$ | 3(11) | 1(1) | (00, 0, 11, 1) |
| 8 | $\cos(\pi/16)$ | 0(00) | −1(0) | 8 | $-\cos(7\pi/16)$ | 3(11) | −1(0) | (00, 0, 11, 0) |
| 9 | $-\cos(3\pi/16)$ | 1(01) | −1(0) | 9 | $-\cos(5\pi/16)$ | 2(10) | −1(0) | (01, 0, 10, 0) |
| 10 | $-\cos(5\pi/16)$ | 2(10) | −1(0) | 10 | $-\cos(3\pi/16)$ | 1(01) | −1(0) | (10, 0, 01, 0) |
| 11 | $-\cos(7\pi/16)$ | 3(11) | −1(0) | 11 | $-\cos(\pi/16)$ | 0(00) | −1(0) | (11, 0, 00, 0) |
| 12 | $\cos(7\pi/16)$ | 3(11) | 1(1) | 12 | $-\cos(\pi/16)$ | 0(00) | −1(0) | (11, 1, 00, 0) |
| 13 | $\cos(5\pi/16)$ | 2(10) | 1(1) | 13 | $-\cos(3\pi/16)$ | 1(01) | −1(0) | (10, 1, 01, 0) |
| 14 | $\cos(3\pi/16)$ | 1(01) | 1(1) | 14 | $-\cos(5\pi/16)$ | 2(10) | −1(0) | (01, 1, 10, 0) |
| 15 | $\cos(\pi/16)$ | 0(00) | 1(1) | 15 | $-\cos(7\pi/16)$ | 3(11) | −1(0) | (00, 1, 11, 0) |

Therefore, when an input vector is input into the filtering apparatus 20, the filtering apparatus 20 selects one set of corresponding data directly from the look-up table formed by the pre-stored data in the memory 33a and outputs the modulation signal by simply summing up the selected data. Compared with the prior art, the expensive multiplier necessary in the prior art is replaced and saved. The pre-stored data in the memory 33a is further simplified with the particular signal process of the present invention according to the mathematical trigonometric function. The data stored in the memory is reduced 8 to 10 times at most than the prior art. Then, the memory in the 8PSK system is saved greatly.

Furthermore, the $\pi/16$ phase shift module 13 executes the particular signal process of the filtering apparatus 20 of the present invention. The $\pi/16$ phase shift module 13 is used for further shifting the second vector from the $3\pi/8$ phase shift module 12 with $\pi/16$ radian to generate a corresponding third vector. The object is to make different third vectors have more excellent symmetry and be simplified further so that the memory is saved.

Please refer to Table 1. Table 1 is an encoding table 30 of an encoding process of an encoder 31 shown in FIG. 5 according to one embodiment. The encoding process is to get the encoding signal 30c from the encoding table 30 according to the real part 30a and the imaginary part 30b of the third vector $\hat{S}'_i$. Each encoding signal 30c comprises a real-part magnitude code $Ec_i$, a real-part sign code $Sc_i$, an imaginary-part magnitude code $Es_i$, and an imaginary-part sign code $Ss_i$. According to one preferred embodiment of the present invention, the real-part and imaginary-part magnitude code only have 2 bits respectively, and the real-part and imaginary-part sign code only have 1 bit respectively. In other words, each encoding signal has 6 bits. According to the mathematical trigonometric function, the plurality of corresponding real-part magnitudes and imaginary-part Give an example for explaining the process of encoding the third vector to a corresponding encoding signal, and please refer to FIG. 4. First, a third vector 12 is selected from FIG. 4, and the third vector 12 is equal to p=12 in Table 1. According to $\cos(\pi(2p+1)/16)$ as a real-part conversion equation and $\sin(\pi(2p+1)/16)$ as an imaginary-part conversion equation, $\cos(25\pi/16)$ and $\sin(25\pi/16)$ are generated. Based on the mathematical trigonometric function, $\cos(25\pi/16)=\cos(7\pi/16)$ and $\sin(25\pi/16)=-\cos(\pi/16)$ are derived. Therefore, the real-part magnitude code $Ec_i$ is 11 (binary), the real-part sign code $Sc_i$ is 1 (binary), the imaginary-part magnitude code $Es_i$ is 00 (binary), and the imaginary-part sign code $Ss_i$ is 0 (binary) are obtained. Then, the third vector 12 is corresponding to the encoding signal (11,1,00, 0). When the real-part sign code $Sc_i$ or the imaginary-part sign code $Ss_i$ is 0, it represents a negative.

Based on the standard of GSM 5.04, the generation of the modulation signal as the output in the present invention relates to the encoding signals of current and previous input signals and previous 4 encoding signals. For example, as shown in FIG 5, $Ec_{i-1}$ represents the real-part magnitude code of the last encoding signal. Therefore, temporarily storing current and previous encoding signals is necessary so that the combination module can utilize the encoding signals to generate the modulation signal during the follow-up combination process.

The weight distribution module 33 distributes a plurality of selected weights to a predetermined distribution waveform and stores a plurality of corresponding weighted distribution waveforms. The plurality of weights selected by the weight distribution module 33 are the probable absolute value of $C_0(t)$ multiplied by $\cos(\pi/16)$, $\cos(3\pi/16)$, $\cos(5\pi/16)$, and $\cos(7\pi/16)$.

Figure 6:
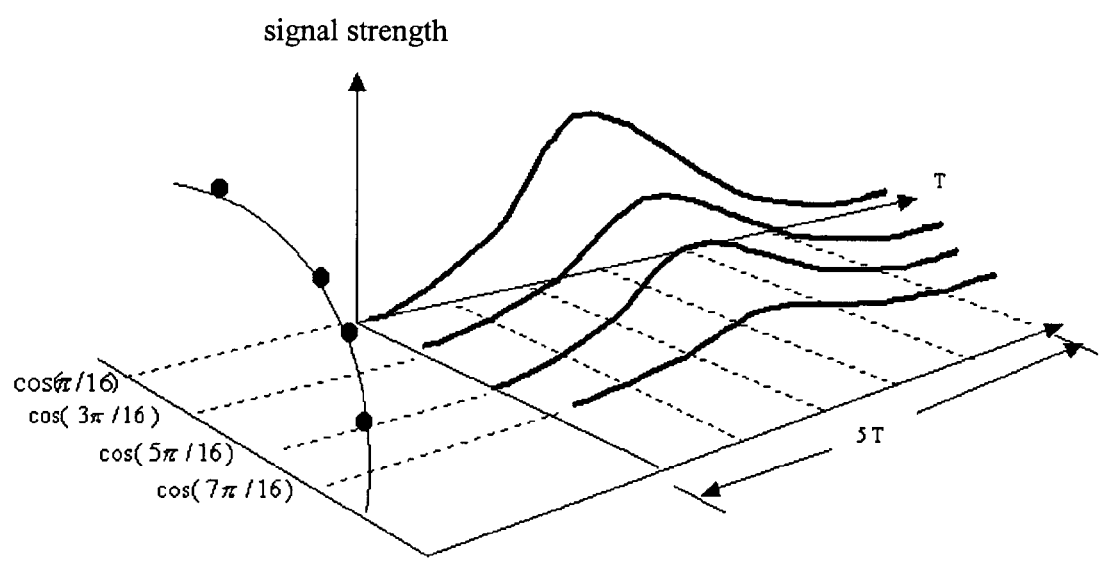
FIG. 6 is a schematic diagram of the predetermined distribution waveform in the filtering apparatus shown in FIG. 5.

Please refer to FIG. 6. FIG. 6 is a schematic diagram of the predetermined distribution waveform in the filtering apparatus 20 shown in FIG. 5. On the basis of the standard of GSM 5.04, the filtering coefficient Co(t) is defined as the following:

$$c_o(t) = \begin{cases} \prod_{i=o}^{3} S(t+iT), & \text{for } o \leq t \leq 5T \\ 0, & \text{else} \end{cases}$$

$$\begin{cases} \prod_{i=o}^{3} S(t+iT), & \text{for } o \leq t \leq 5T \\ 0, & \text{else} \end{cases}$$

where $$S(t) = \begin{cases} \sin\left(\pi \int_0^i g(t')dt'\right), & \text{for } 0 \leq t \leq 4T \\ \sin\left(\frac{\pi}{2} - \pi \int_0^{i-4T} g(t')dt'\right), & \text{for } 4T < t \leq 8T \\ 0, & \text{else} \end{cases}$$

$$g(t) = \frac{t}{2T_e}\left(Q\left(2\pi \cdot 0.3 \frac{t-5T/2}{T\sqrt{\log_e(2)}}\right) - Q\left(2\pi \cdot 0.3 \frac{t-3T/2}{T\sqrt{\log_e(2)}}\right)\right) \text{ and }$$

$$Q(t) = \frac{1}{\sqrt{2\pi}} \int_i^\infty e^{-\frac{\tau^2}{2}} d\tau.$$

On the basis of the standard of GSM 5.04 (V8.0.8) for the output (the modulation signal) of 8PSK system:

$$y(t') = \sum_i \hat{s}_i \cdot c_o\left(t' - iT + \frac{5}{2}T\right)$$

The generation of the output relates to the current input vector and previous 4 input vectors (i=0~4). Therefore, the shift register 32 of the present invention temporarily stores 5 encoding signals including current and previous 4 encoding signals ($Ec_i$, $Sc_i$, $Es_i$, $Ss_i$) in principle. And the distribution waveform is divisible to be 5 sub-distribution waveforms $Co_i(t)$ (i=0~4) in principle to represent with the 5 encoding signals from the 5 input vectors.

The weight distribution module 33 comprises a memory having 5 memory units 33b, and each memory unit 33b is utilized to store plural weighted sub-distribution waveforms after the corresponding weights are distributed to the sub-distribution waveforms. For example, the memory unit shown in right side of FIG. 3 is used for storing the data of multiplying the sub-distribution waveform $Co_4(t)$ with different weights: $\cos(\pi/16)* Co_4(t)$, $\cos(3\pi/16)* Co_4(t)$, $\cos(5\pi/16)* Co_4(t)$, and $\cos(7\pi/16)* Co_4(t)$. Practically, how many points are sampled and stored within each weighted sub-distribution waveform is based on the practical request of the system and the capacity of the memory unit. In general, the sampling of each weighted sub-distribution waveform should at least have 16 points to be incapable of getting wrong result.

Figure 7:
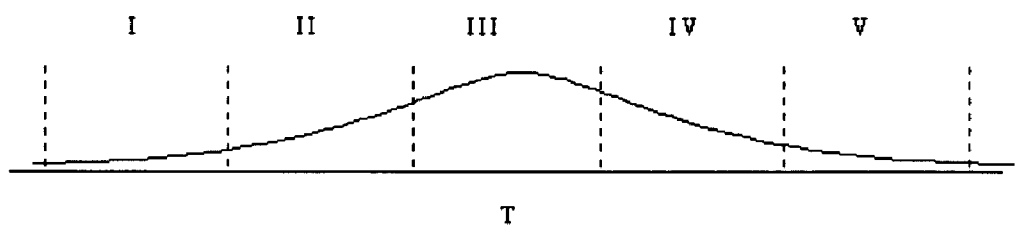
FIG. 7 is a distribution waveform that a filtering coefficient Co(t) relates to 5T.
Figure 8:
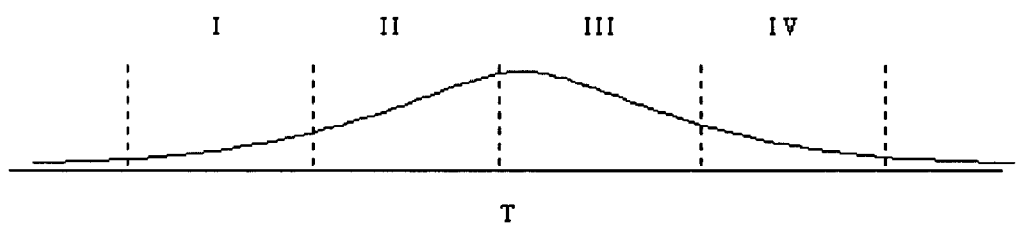
FIG. 8 is a distribution waveform that a filtering coefficient Co(t) relates to 4T.

Please refer to FIG. 7 and FIG. 8. FIG. 7 is a distribution waveform that a filtering coefficient Co(t) relates to 5T. FIG. 8 is a distribution waveform that a filtering coefficient Co(t) relates to 4T. As shown in FIG. 7, the anterior half of I and the posterior half of V are nearly zero. Therefore, the two sections can be ignored. Because of the length of each section in the distribution waveform diagram is still T, the non-ignored sections are distributed to 4 sections of T after ignoring the anterior half of I and the posterior half of V shown in FIG. 7, as shown in FIG. 8. In other words, because the ignored sections only have a little affection in the filtering process, using 4 memory units to correspond to the non-ignored sections is not only unaffected for the accuracy of the filtering result but also saves the memory, wherein the pre-stored data of the 4 memory units of the preferred embodiment according to the present invention respectively are:

$$ROM_4(k) = \begin{cases} \cos(\pi/16) \cdot C_0'(3 \cdot OVS + k); & 0 \leq k \leq OVS-1 \\ \cos(3\pi/16) \cdot C_0'(2 \cdot OVS + k); & OVS \leq k \leq 2OVS-1 \\ \cos(5\pi/16) \cdot C_0'(1 \cdot OVS + k); & 2OVS \leq k \leq 3OVS-1 \\ \cos(7\pi/16) \cdot C_0'(k); & 3OVS \leq k \leq 4OVS-1 \end{cases}$$

$$ROM_3(k) = \begin{cases} \cos(\pi/16) \cdot C_0'(2 \cdot OVS + k); & 0 \leq k \leq OVS-1 \\ \cos(3\pi/16) \cdot C_0'(OVS + k); & OVS \leq k \leq 2OVS-1 \\ \cos(5\pi/16) \cdot C_0'(k); & 2OVS \leq k \leq 3OVS-1 \\ \cos(7\pi/16) \cdot C_0'(k - OVS); & 3OVS \leq k \leq 4OVS-1 \end{cases}$$

$$ROM_2(k) = \begin{cases} \cos(\pi/16) \cdot C_0'(OVS + k); & 0 \leq k \leq OVS-1 \\ \cos(3\pi/16) \cdot C_0'(k); & OVS \leq k \leq 2OVS-1 \\ \cos(5\pi/16) \cdot C_0'(k - OVS); & 2OVS \leq k \leq 3OVS-1 \\ \cos(7\pi/16) \cdot C_0'(k - OVS); & 3OVS \leq k \leq 4OVS-1 \end{cases}$$

$$ROM_1(k) = \begin{cases} \cos(\pi/16) \cdot C_0'(k); & 0 \leq k \leq OVS-1 \\ \cos(3\pi/16) \cdot C_0'(k - OVS); & OVS \leq k \leq 2OVS-1 \\ \cos(5\pi/16) \cdot C_0'(k - 2OVS); & 2OVS \leq k \leq 3OVS-1 \\ \cos(7\pi/16) \cdot C_0'(k - 3OVS); & 3OVS \leq k \leq 4OVS-1 \end{cases}$$

wherein the oversampling rate (OVS) is 16.

Figure 9:
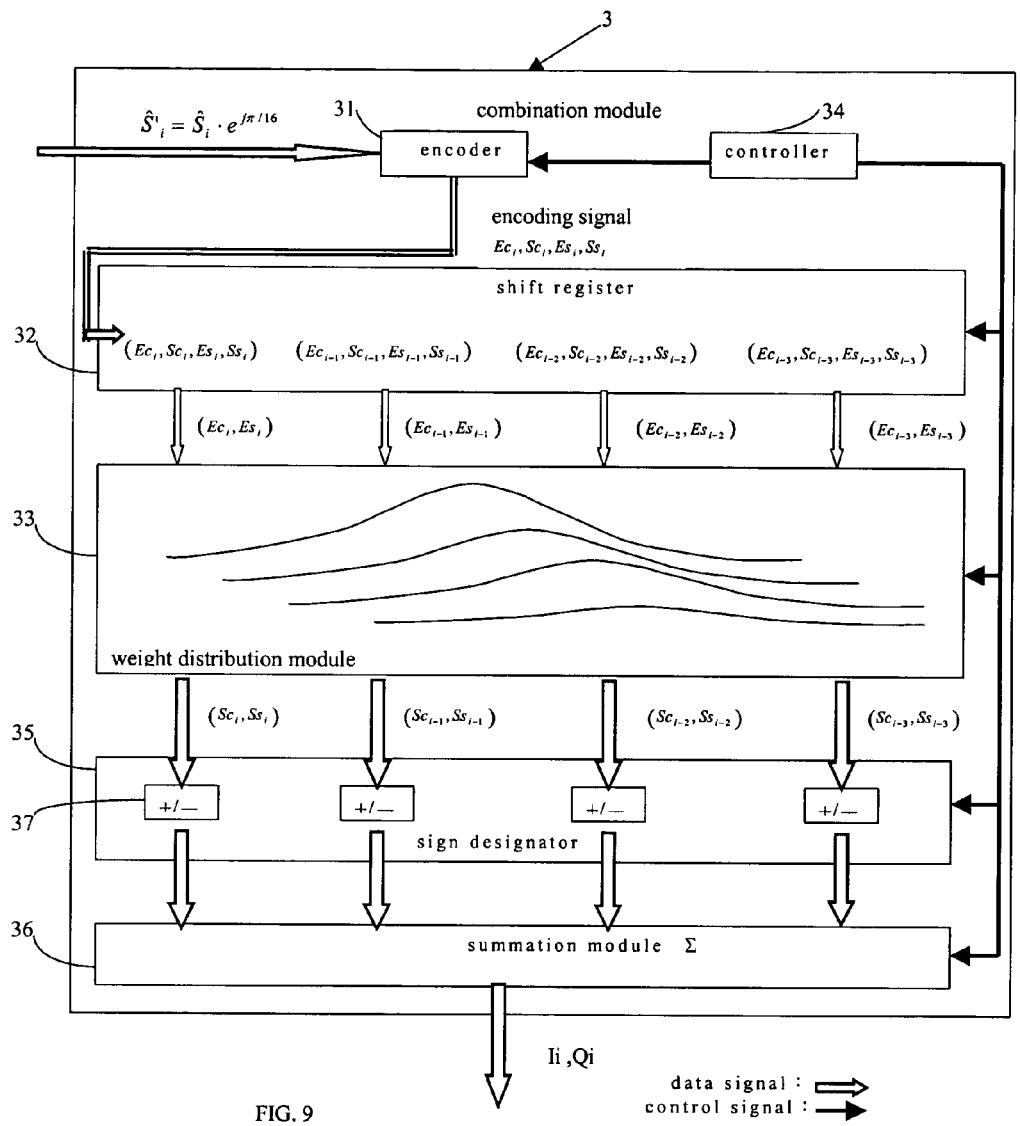
FIG. 9 is a schematic diagram of a combination module in the filtering apparatus of another embodiment according to the present invention.

Please refer to FIG. 9. FIG. 9 is a schematic diagram of a combination module 3 in the filtering apparatus of another embodiment according to the present invention. Because partial sections of the pre-stored distribution waveform in the weight distribution module 33 (shown in FIG. 5) can be ignored, the memory units of the weight distribution module 33 of the combination module 3 are reduced to 4 so that the memory is saved. As shown in FIG. 9, one modulation signal generated from the preferred embodiment according to the present invention only relates to the current encoding signal and the previous 3 encoding signals. Therefore, the current filtering process only processes 4 signals. The filtering method of the present invention is described in the following.

As shown in FIG. 9, the filtering apparatus of the present invention distributes a plurality of selected weights to a predetermined distribution waveform to generate a plurality of corresponding weighted distribution waveforms stored in a weight distribution module 33. And the encoder 31 encodes the data of the encoding table of Table 1 to generate an encoding signal ($Ec_i$, $Sc_i$, $Es_i$, $Ss_i$) corresponding to the above third vector. Each encoding signal comprises a real-part magnitude code $Ec_i$, a real-part sign code $Sc_i$, an imaginary-part magnitude code $Es_i$, and an imaginary-part sign code $Ss_i$. Then, the plurality of current and previous encoding signals ($Ec_i$, $Sc_i$, $Es_i$, $Ss_i$) generated by the encoder 31 are temporarily stored in the shift register 32. The corresponding weighted distribution waveforms are selected from the weight distribution module 33 according to the real-part magnitude codes $Ec_i$ or the imaginary-part magnitude code $Es_i$. The corresponding positive or negative sign is designated to the selected weighted distribution waveforms by the sign designator 35 according to the real-part sign codes $Sc_i$ or imaginary-part sign code $Ss_i$ of the above encoding signal($Ec_i,Sc_i,Es_i,Ss_i$). Finally, the selected weighted distribution waveforms after sign converted according to $Sc_i$ and $Ss_i$ are combined by the summation module 36 to generate the modulation signal (Ii, Qi) including the real-part modulation signal and the imaginary-part modulation signal. With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A filtering apparatus in an 8 Phase Shift Keying (8PSK) system, the 8PSK system being utilized for encoding a series of digital bits to output a plurality of corresponding modulation signals, the 8PSK system comprising:
    a Gray mapping module for mapping a set of every 3 digital bits into a corresponding first vector by a predetermined mapping process;
    a $3\Pi/8$ phase shift module for shifting the phase of the first vector from the Gray mapping module to generate a corresponding second vector by a predetermined phase shift process; and
    a filtering apparatus for filtering the second vector from the $3\Pi/8$ phase shift module to generate one corresponding modulation signal out of the plurality of modulation signals;
    the filtering apparatus further comprising:
    a $\Pi/16$ phase shift module for further shifting the second vector from the $3\Pi/8$ phase shift module with $\Pi/16$ radians to generate a corresponding third vector;
    a weight distribution module for distributing a plurality of selected weights to a predetermined distribution waveform and for storing a plurality of corresponding weighted distribution waveforms; and
    a combination module, according to the third vector, for determining which weight distribution waveforms to be selected from the weight distribution module and combining the selected weighted distribution waveforms to generate the modulation signal.

2. The filtering apparatus of claim 1, wherein the set of every 3 digital bits mentioned in the above constitutes 8 different permutations, and the predetermined mapping process comprises: mapping each permutation of the 3 digital bits into the corresponding first vector having the same magnitude but different phase, and the phase difference between the adjacent first vectors being $\Pi/4$.

3. The filtering apparatus of claim 1, wherein the predetermined phase shift process comprises: each time the phase of the current first vector shifted by the $3\Pi/8$ phase shift module being a phase of the sum of the phase of the previous first vector shifted by the $3\Pi/8$ phase shift module plus $3\Pi/8$ radians, and thereby generating the corresponding second vectors.

4. The filtering apparatus of claim 2, wherein the plurality of second vectors generated by the $3\Pi/8$ phase shift module constitute only 16 different possibilities, and the phase difference between the adjacent second vectors is $\Pi/8$.

5. The filtering apparatus of claim 1, wherein the plurality of third vectors generated by the $\Pi/16$ phase shift module constitute only 16 different possibilities, and the phase difference between the adjacent third vectors is $\Pi/8$.

6. The filtering apparatus of claim 5, wherein each the plurality of third vectors is composed of a real part and an imaginary part, the real part is composed of a real-part magnitude and a real-part sign digit, the real-part magnitude represents the absolute value of the real part, and the real-part sign digit represents the positive or negative sign of the real part; the imaginary part is composed of an imaginary-part magnitude and an imaginary-part sign digit, the imaginary-part magnitude represents the absolute value of the imaginary part, and the imaginary-part sign digit represents the positive or negative sign of the imaginary part.

7. The filtering apparatus of claim 6, wherein all the plurality of corresponding real-part magnitudes and imaginary-part magnitudes of the third vectors are selected from one of the following combinations: $\cos(\Pi/16)$, $\cos(3\Pi/16)$, $\cos(5\Pi/16)$, and $\cos(7\Pi/16)$.

8. The filtering apparatus of claim 1, wherein the weight distribution module is accommodated in the combination module, and the plurality of weights selected by the weight distribution module is one of the following combinations: $\cos(\Pi/16)$, $\cos(3\Pi/16)$, $\cos(5\Pi/16)$, and $\cos(7\Pi/16)$.

9. The filtering apparatus of claim 8, wherein all the third vectors are derivable from the selected weights by the weight distribution module via mathematical trigonometric function.

10. The filtering apparatus of claim 1, wherein the combination module further comprises:
    an encoder, according to the phase of each of the third vectors, for encoding the third vector to generate a corresponding encoding signal; and
    a shift register comprising a plurality of buffer units for temporarily storing the plurality of current and previous encoding signals generated by the encoder.

11. The filtering apparatus of claim 10, wherein each of the plural encoding signals comprises a real-part magnitude code, a real-part sign code, an imaginary-part magnitude code, and an imaginary-part sign code.

12. The filtering apparatus of claim 11, wherein the modulation signal comprises a real-part modulation signal and an imaginary-part modulation signal.

13. The filtering apparatus of claim 12, wherein the combination module further comprises:
    a controller, for selecting the corresponding weighted distribution waveforms from the weight distribution module in responsive to the real-part magnitude codes in the buffer units;
    a sign designator, under the control of the controller, for designating the corresponding positive or negative sign to the weighted distribution waveforms selected by the controller in responsive to the real-part sign codes; and
    a summation module for summing up the plurality of weighted distribution waveforms after the sign designator completes the sign designation, to generate the real-part modulation signal.

14. The filtering apparatus of claim 13, wherein the controller further selects the corresponding weighted distribution waveforms from the weight distribution module in responsive to the imaginary-part magnitude codes in the buffer units; and the sign designator, under the control of the controller, designates the corresponding positive or negative sign to the weighted distribution waveforms selected by the controller in responsive to the imaginary-part sign codes; and the summation module sums up the plurality of weighted distribution waveforms after the sign designator completes the sign designation, to generate the imaginary-part modulation signal.

15. The filtering apparatus of claim 13, wherein the sign designator comprises a plurality of sign designation units, and each of the sign designation units designates the corresponding positive or negative sign to the weighted distribution waveforms selected by the controller according to the real-part sign codes and the imaginary-part sign codes.

16. The filtering apparatus of claim 1, wherein the predetermined distribution waveform is divisible to be a plurality of sub-distribution waveforms, the weight distribution module comprises a memory having a plurality of memory units, and each memory unit is utilized to store a plural weighted sub-distribution waveforms after the corresponding weights are distributed to the sub-distribution waveforms.

17. A filtering method in an 8 Phase Shift Keying (8PSK) system, the 8PSK system being utilized for encoding a series of digital bits to output a plurality of corresponding modulation signals, the 8PSK system comprising:
a Gray mapping module for mapping a set, of every 3 digital bits into a corresponding first vector by a predetermined mapping process; a 3Π/8 phase shift module for shifting the phase of the first vector from the Gray mapping module to generate a corresponding second vector by a predetermined phase shift process; and
a filtering apparatus for filtering the second vector from the 3Π/8 phase shift module to generate one corresponding modulation signal out of the plurality of modulation signals;
the filtering method further comprising:
shifting the second vector from the 3Π/8 phase shift module with Π/16 radians to generate a corresponding third vector;
distributing a plurality of selected weights to a predetermined distribution waveform to generate a plurality of corresponding weighted distribution waveforms and being stored in a weight distribution module; and
according to the third vector, determining which weight distribution waveforms to selected from the weight distribution module and combining the selected weighted distribution waveforms to generate the modulation signals.

18. The filtering method of claim 17, wherein the filtering method further comprises:
according to the phase of each of the third vectors, encoding the third vector to generate a corresponding encoding signal;
temporarily storing the plurality of current and previous encoding signals generated by the encoder.

19. The filtering method of claim 18, wherein each of the plural encoding signals comprises a real-part magnitude code, a real-part sign code, an imaginary-part magnitude code, and an imaginary-part sign code, the modulation signal comprises a real-part modulation signal and an imaginary-part modulation signal, and the filtering method further comprises:
selecting the corresponding weighted distribution waveforms from the weight distribution module in responsive to the real-part magnitude codes;
designating the corresponding positive or negative sign to the weighted distribution waveforms selected by the controller in responsive to the real-part sign codes; and
summing up the plurality of weighted distribution waveforms after the sign designator completes the sign designation, to generate the real-part modulation signal.

20. The filtering method of claim 19, wherein the filtering method further comprises:
selecting the corresponding weighted distribution waveforms from the weight distribution module in responsive to the imaginary-part magnitude codes;
designating the corresponding positive or negative sign to the weighted distribution waveforms selected by the controller in responsive to the imaginary-part sign codes; and
summing up the plurality of weighted distribution waveforms after the sign designator completes the sign designation, to generate the imaginary-part modulation signal.

* * * * *